United States Patent [19]

Su

[11] Patent Number: 4,608,192

[45] Date of Patent: Aug. 26, 1986

[54] GRAPHITE INTERCALATES CONTAINING METAL-CHARGE TRANSFER SALTS

[75] Inventor: Sophia R. Su, Weston, Mass.

[73] Assignee: GTE Laboratories Incorporated, Waltham, Mass.

[21] Appl. No.: 570,900

[22] Filed: Jan. 16, 1984

[51] Int. Cl.$^4$ .............................................. H01B 1/06
[52] U.S. Cl. .................................. 252/506; 252/502; 556/112; 423/448
[58] Field of Search ...................... 252/518, 506, 502; 260/429 R, 665 R; 556/110, 112; 423/448, 449; 523/137

[56] References Cited

U.S. PATENT DOCUMENTS

| | | | |
|---|---|---|---|
| 3,956,194 | 5/1976 | Armand | 252/506 |
| 3,962,133 | 6/1976 | Rodewald | 502/181 |
| 3,984,352 | 10/1976 | Rodewald | 502/181 |
| 4,374,048 | 2/1983 | Kim et al. | 252/500 |
| 4,477,374 | 10/1984 | Watanabe et al. | 252/506 |
| 4,565,649 | 1/1986 | Vogel | 252/506 |

OTHER PUBLICATIONS

J. E. Fischer and T. E. Thompson, Graphite Intercalation Compounds, *Physics Today*, Jul. 1978, pp. 36–45.

M. S. Dresselhaus and G. Dresselhaus, Intercalation Compounds of Graphite, *Advances in Physics*, 30: 139–326 (1981).

*Primary Examiner*—J. L. Barr
*Attorney, Agent, or Firm*—Hamilton, Brook, Smith & Reynolds

[57] ABSTRACT

A stabilized graphite intercalation product can be formed by sequential intercalation of graphite. Graphite is initially intercalated with an alkali metal (M). The unstable alkali metal intercalation compound is then intercalated with an organic acid (R) to form a room temperature stable, graphite intercalation containing a metal charge transfer salt of the type $M^+R^-$.

6 Claims, No Drawings

GRAPHITE INTERCALATES CONTAINING METAL-CHARGE TRANSFER SALTS

FIELD OF THE INVENTION

This invention relates to graphite and particularly to graphite which has been intercalated with a metal-charge transfer salt in order to form a stable and conductive intercalate.

BACKGROUND OF THE INVENTION

Graphite is a crystalline form of carbon which is a moderate conductor of electricity and is relatively soft. The carbon atoms in graphite form a layered structure in which the carbon atoms in each plane are covalently bonded to each other.

In graphite, each carbon atom is bonded to three other carbon atoms in each layer. After forming a strong covalent sigma ($\sigma$) bond with each neighbor, each carbon atom still has one free electron remaining and these are paired up in a system of weak pi ($\pi$) bonds. It is the fourth, or pi electron, that is responsible for the laminar structure and electronic properties of graphite. The pi electrons form a delocalized distribution which constitute a valance band for the fundamental state of graphite and a conduction band for the excited stage.

The graphite layers, or sheets, are weakly bonded to each other by van der Waals forces. This weak bonding between layers may account for both the lubrication properties and the highly anisotropic (layer directed) conductive nature of graphite.

The intercalation, or the incorporation of acceptor or donor compounds into the layered structure of graphite has been known for many years. Intercalated graphite contains acceptor or donor compounds (an intercalant) interspaced between the layers or planes of the graphite. Thus, during synthesis the intercalant diffuses in between the planes and electron exchanges take place between the intercalant and the electronic structure of graphite.

Intercalated graphite can form different stage products. A first stage intercalation compound has alternate layers of graphite and the intercalant; a second stage compound has two layers of graphite for each layer of intercalant and a third stage compound has three layers of graphite per layer of intercalant, etc.

Intercalation of graphite with certain intercalants greatly enhances the ability of graphite to conduct electricity in the planes of the layered structure. Some graphite intercalation compounds, for example, conduct electricity in the direction of the planes almost as well as metals. In addition to being an excellent electrical conductor, intercalated graphite is lightweight and relatively inexpensive when compared to many metallic conductors. It is this promise of an inexpensive and lightweight conductor that has provided the motivation for experimentation with intercalated graphite particles. It should be noted that intercalated graphite might be specially tailored for particular conductor and semiconductor uses. Tailoring these compounds could be done by changing the staging of the intercalated graphite, and the type and amount of the intercalant.

The major problem preventing successful use of graphite intercalates as conductors is the thermal and chemical instability of intercalation compounds. Most existing graphite intercalation compounds and virtually all the useful electrically conducting ones are easily decomposed or are very hydroscopic. As a result, most graphite intercalation compounds are unstable in air because the intercalant diffuses out of the graphite lattice at a substantial rate or the compound rapidly exfoliates in contact with water vapor. This instability renders graphite intercalation compounds unsuitable for use as permanent electrical connectors. Because of the instability of graphite intercalations, even structural studies of the compounds must often be conducted under controlled atmospheres or within sealed tubes.

A need therefore exists for air-stable graphite intercalation compounds.

SUMMARY OF THE INVENTION

The invention comprises graphite intercalated with metal charge transfer salts. The salt is the product of two successive reactions. Initially, a metal (M) capable of being intercalated into graphite is intercalated into the graphite structure. The unstable metal intercalation compound (M) is then reacted with an organic acid (R) to form anion-radical salts of the type $M^+R^-$ within the graphite structure. These intercalated metal charge transfer salts stabilize the graphite intercalate by means of ionic bonds.

Metals which can be intercalated into graphite and can be used with the organic acid intercalant include the alkali metals potassium, rubidium, cesium, lithium and the compound cuprous chloride. Organic acids can be selected from a group comprising 7,7,8,8 tetracyanoquinomethane (TCNQ); tetracyanoethylene (TCNE); 1,2 dicyanobenzene; 1,4 dicyanobenzene; dicyanoethylene; diphenylacetylene; tetrachloroethylene; and 1,2,4,5 tetracyanobenzene (TCNB).

The preferred method of synthesizing a stabilized graphite intercalate comprises the steps of placing graphite in the first zone of a two zone vapor transport reactor and placing an alkali metal or copper chloride in a second zone of said reactor. The reactor is then evacuated. Heat is supplied to the second zone of said reactor to provide a temperature therein sufficient to vaporize the metal and produce a partial pressure sufficient to promote intercalation.

Sufficient heat is also provided to the first zone of said reactor to provide a temperature therein slightly elevated with regard to the temperature in said second zone and sufficient to prevent condensation of the metal vapor on the graphite. The reaction conditions are maintained until the graphite has been intercalated with the desired alkali metal.

After a graphite metal intercalation compound has been formed, a sequential intercalation technique is pursued. The graphite is placed in a second two temperature zone vapor phase reactor. An organic acid is then placed in the second zone of the second reactor. The reactor is evacuated and sealed. Heat is then supplied to the reactor zone containing the metal graphite intercalation compound sufficient to promote intercalation and to prevent recrystallization of the organic acid upon the graphite metal intercalation compound. The organic acid is heated to a temperature slightly below the temperature of the metal graphite compound and the reaction conditions are maintained until a metal charge transfer salt is formed within the graphite structure.

DETAILED DESCRIPTION OF THE INVENTION

Intercalation compounds of graphite are of interest because of the unusual properties that derive mainly from their high degree of crystal anisotropy (directionality in the planes). The graphite structure, composed of tightly bonded, loosely stacked planes, produces a two dimensionality that results in high plane strength and elastic modulus, high electrical conductivity, selective catalytic and chemical reactions, and other interesting phenomena.

As mentioned above, graphite intercalation compounds are not widely used in industrial applications because of their chemical instability. Most of the known intercalation products are unstable in air, with either electron donor intercalants being easily oxidized or electron acceptor molecules being easily desorbed. Thus, the new class of air-stable graphite intercalation compounds disclosed herein will permit much more extensive utilization of the novel properties of intercalated graphite.

The direct current electrical conductivity of graphite is generally increased upon intercalation with either chemical oxidants, such as halogens, Lewis acids, protonic acids, or reducing agents such as the alkali metals. The increase in conductivity along the stacked aromatic planes in intercalation compounds is created by a fractional charge transfer between the graphite aromatic electron band system and the intercalant molecules. The chemical change and conductivity are intrinsically linked, so that electrons added to or removed from the aromatic planes become, in part, the carriers of the electrical current. Furthermore, the process of intercalation creates carriers which scatter less than intrinsic graphite. This results in an increase in the carrier concentration as well as the mobility of the carrier. One example of particularly good conductors is the graphite alkali metal intercalations. These compounds, however, are not stable.

Experimentation aimed at the production of synthetic metals, or synmetals, has shown that several organic acids form stable crystalline anion-radical salts with various metals such as alkali, alkaline earth, and transition metals. The resultant anion radical salts have a wide a variety of physical properties which include especially high direct current electrical conductivity at room temperature. If these organic acids, or organic acceptor molecules, could be introduced into the graphite complex, the resulting product might be a useful conductor. Attempts to diffuse these organic molecules into the graphite lattice either by the vapor transport technique or by the solution method have been unsuccessful. None of the stronger organic acids have been directly intercalated into graphite layers.

The invention comprises the use of alkali metal graphite intercalated compounds as hosts for the intercalation of graphite with organic acceptor molecules. Both natural and synthetic graphite may be used as starting materials for the formation of alkali metal intercalations and the stabilized charge transfer salt final product.

Highly oriented pyrolytic graphite (HOPG) is synthetically formed by cracking a hydrocarbon at high temperatures and high pressure. HOPG can be intercalated with metals, metal halides, other electron acceptors or electron donors.

Carbon fibers are another class of synthetic graphite and have great mechanical strength. Intercalation of graphite fibers has provided a method for variation of properties in a potentially important class of material.

Alkali metal intercalated compounds can be prepared by standard methods such as those described by A. Herold, Bulletin Societe Chemical, France, page 999, 1955. In this method, graphite is outgased in vacuum and then intercalated in a two zone vapor transport reactor wherein the alkali metal is heated to a temperature slightly below that to which the graphite is heated. Alkali metals suitable for intercalation into graphite as a first step in this synthesis include potassium, lithium, rubidium, and cesium. In addition, copper can be used. These intermediate compounds, however, are not stable and therefore must be specially protected from the environment to prevent decomposition prior to their stabilization with organic acid. The sample intercalation compounds were therefore characterized by X-ray diffraction in sealed sample chambers. Intercalated graphites thus formed include K—C, Rb—C, Cs—C, Li—C, and CuCl—C.

The first step of further intercalating the graphite comprises recrystallizing or sublimating the chosen organic acid from a suitable solvent. Organic acids which can be used include 7,7,8,8 tetracyanoquinomethane (TCNQ); tetracyanoethylene (TCNE); 1,2 dicyanobenzene; 1,4 dicyanobenzene; dicyanoethylene; diphenylacetylene, tetrachloroethylene; and 1,2,4,5 tetracyanobenzene (TCNB).

The previously prepared metal graphite intercalation compound is put into the first zone of a two zone reactor. The organic acid is put in the second zone of the two zone vapor transport reactor. The reactor is then evacuated to a low pressure, e.g. $1 \times 10^{-6}$ mm of mercury, and sealed off.

The chamber containing the graphite is heated to between 170° and 200° C. The zone of the reactor containing the organic acid is also heated, but to a temperature slightly below that of the graphite. A typical reaction is maintained for about 24 hours. At the end of the 24 hours, the stabilized graphite intercalation containing a metal charge transfer salt can be removed from the reactor.

An alternate method used for the synthesis of a graphite intercalate containing metal charge transfer salt is a liquid intercalation method. In this case, the alkali metal graphite intercalate is immersed in a hot, dry deaerated polar solvent containing saturated organic acid for 4–8 hours. Suitable polar solvents include acetonitrile, tetrahydrofuran, ethyl ether, ethylacetate, and acetone. A solvent temperature of about 80° C. provides a sufficient reaction rate. It is important that the polar solvent is moisture free; otherwise the metal intercalate will form metallic hydroxides (MOH). Further, the presence of any air or oxygen bubbles in the solvent would promote the formation of oxides ($M_2O$). A homogeneous intercalated product can be obtained by this method when it is carefully controlled.

It should also be noted that an electrochemical synthesis method could also be effective for intercalating the organic acid into the graphite metal intercalation compound.

In a special case, copper chloride ($CuCl_2$) intercalated graphite can be reduced to cuprous chloride (Cu—Cl) by hydrogen ($H_2$) gas then reacted with organic acid by the liquid intercalation method to give $CuCl+R^-$ and $Cu+R^-$ charge transfer salt intercalated graphite.

Characterization of graphite intercalated with metal charge transfer salts may be done by optical infrared absorption spectroscopy and elemental analysis methods. Presence of the organic acid radical may be confirmed on the basis of the absorption spectra of infrared light passed through the intercalation compound. Further characterization of the intercalated graphite salt can be carried out by X-ray diffraction, thermal gravimetric analysis, and weight change measurements. X-ray diffraction, in particular, is useful to reliably analyze and distinguish the graphite metal charge transfer salt lattice structure.

Graphite metal charge transfer salts prepared according to this invention have shown complete air stability for a period of over a year. Moreover, electrical conductivity along the basal graphite plane, measured by the radio frequency contactless technique, is generally 10–15% higher than even the parent graphite metal intercalation compounds. The experimental observations and the optical and infrared measurements confirm that the ionic state of the alkali metal and the graphite is stabilized by the formation of a charge transfer salt within the graphite matrix. The precise bonding between the organic acids and alkali metals in the graphite lattice has not yet been determined.

Separation between graphite layers differs in first, second and third stage metal graphite intercalation compounds. Through X-ray diffraction layer unit (Ic) measurements have been obtained and the size of reproduced intercalation units have been established. The measurements are taken in the c-axis direction which is perpendicular to the a-axis (i.e., the plane of the graphite layers). Virgin graphite starting material has a unit size (Ic) of about 3.35 angstroms. A typical first stage unit of graphite metal intercalation compound has a size of about 9.0 angstroms, a second stage unit about 12.0 angstroms, and a third stage unit about 16.0 angstroms. Metal charge transfer salt intercalated graphite has a unit size of about $18.85 \pm 0.5$ angstroms. Thus, through X-ray diffraction, identification of the product can be made.

The invention will now be further illustrated by the following examples:

EXAMPLES 1–14

EXAMPLE 1

The first example comprises a typical alkali metal graphite intercalation. Graphite potassium intercalated compounds were prepared by standard methods. Highly oriented pyrolytic graphite (HOPG) was used in this synthesis. The HOPG was cut into samples approximately 0.25 inches square and $8.5 \times 10^{-3}$ inches thick. Prior to intercalation, the graphite was outgased at 450° C. in vacuum for 2 hours, and the potassium was purified by distillation. The reactants were then placed in a two zone vapor transport reactor. The two zone vapor transport reactor was evacuated to $10^{-6}$ mm-Hg prior to each reaction. The reaction temperature for each stage potassium-graphite intercalate is tabulated as follows:

| Potassium-graphite Intercalates | $T_{Potassium}°C.$ | $T_{graphite}°C.$ |
|---|---|---|
| $C_8K$ 1st stage | 250° | 318° |
| $C_{24}K$ 2nd stage | 250° | 390° |
| $C_{36}K$ 3rd stage | 250° | 462° |

The reaction was continued from 4–24 hours depending on the stage of graphite to be prepared and the thickness of the HOPG. The samples so prepared were characterized according to unit size (Ic) by the X-ray diffraction method.

EXAMPLE 2

The preparation of graphite intercalates containing metal-charge transfer salts was pursued by a sequential intercalation technique. The graphite-alkali metal compounds were prepared first, as in Example 1. The organic acids were generally purified by recrystallization from a suitable solvent/or by a sublimation method. The graphite-potassium sample was put in one end of a two-temperature zone reactor, the organic acid was placed at the other end. The system was then evacuated to $1 \times 10^{-6}$ mm-Hg and sealed off. Typically the reaction conditions were maintained for about 24 hours. The reaction conditions for each example are tabulated below:

| EXAMPLES | POTASSIUM GRAPHITE | ORGANIC ACIDS | $T_{POTASSIUM\ GRAPHITE\ INTERCALATES}$ | $T_{ORGANIC}$ °C. | CHARACTERISTICS |
|---|---|---|---|---|---|
| 2. | $C_8K$ | 7,7,8,8-Tetracyanoquindimethan (TCNQ) Purified by recrystallization | 190° | 165° | (1) electical conductivity along the graphite basal plane retained. (2) air stable (3) thermally decomposed at 850° C. |
| 3. | $C_{24}K$ | TCNQ | 190° | 170° | (1) no change in electrical conductivity (2) air stable (3) thermally decomposed at 850° C. (4) $I_c = 18.85$ Å |
| 4. | $C_8K$ | None | 190° | 170° | (1) hydroscopic, absorbs moisture from air; air unstable (2) sample was exfoliated; typical characteristic of C8K |
| 5. | $C_{24}K$ | None | 190° | 170° | (1) hydroscopic; air unstable (2) sample was exfoliated after exposed to air overnight |
| 6. | $C_{24}K$ | 1,2-dicyano- | 170° | 130° | (1) electrical con- |

| EXAMPLES | POTASSIUM GRAPHITE | ORGANIC ACIDS | T POTASSIUM GRAPHITE INTERCALATES | T ORGANIC °C. | CHARACTERISTICS |
|---|---|---|---|---|---|
| | | benzene | | | ductivity retained<br>(2) air stable |
| 7. | $C_{24}K$ | 1,4-dicyano-benzene | 200° | 170° | (1) electrical conductivity is as high as $C_{24}K$<br>(2) air stable |
| 8. | $C_{24}K$ | Tetracyano-ethylene Purified by sublimation | 180° | 150° | (1) electrical conductivity retained<br>(2) air stable |
| 9. | $C_{36}K$ | TCNQ | 200° | 170° | (1) electrical conductivity retained<br>(2) air stable<br>(3) $I_c = 19.0$ Å |
| 10. | $C_{36}K$ | None | 200° C. | 170° C. | 3rd stage $C_{36}K$ hydroscopic in nature |

The samples containing TCNQ organic acid (Examples 2, 3 and 9) were further characterized by optical, infrared absorption spectroscopy and elemental analysis which confirmed the presence of $K^+TCNQ^-$ in the graphite/TCNQ intercalated samples. The ternary intercalated sample (Example 9) was extracted with acetonitrile. The infrared absorption spectrum of the sample exhibited two major maxima at 420 nanometers and 842 nanometers, with an intensity ratio of 1 to 2, which are the characteristic bands of TCNQ radical. The presence of $TCNQ^-$ radical was further confirmed by its bathochromic shift of $C\equiv N$ absorption in the infrared spectrum from 2222 $cm^{-1}$ in TCNQ neutral molecule to 2160 $cm^{-1}$ in the TCNQ radical. The interlayer spacing (Ic) of all the graphite intercalates containing metal charge transfer salts was equal to $18.85\pm0.5$ angstroms.

The graphite $K^+$ $TCNQ^-$ complex of Examples 2, 3, and 9 shows air stability for a lengthy time (1½ years, no sign of decomposition). Moreover, its electrical conductivity along the basal plane at room temperature as measured by the radio frequency contactless technique is 10 to 15% higher than its parent graphite/potassium intercalant. The experimental observations and the optical, infrared measurements confirm that the ionic state of potassium is stabilized by the formation of a charge-transfer salt with TCNQ molecules.

EXAMPLE 11

Potassium graphite intercalate (3rd stage) was immersed into a concentrated solution of dry deareated acetonitrile (or acetone) containing TCNQ at 80° C. for 4 hours. A homogeneous intercalated product containing $K^+TCNQ$ was obtained. This sample was characterized by infrared spectroscopy and X-ray diffraction method. The interlayer spacing (Ic) of the product is 18.85 Angstroms.

EXAMPLE 12

This example is the same as Example 11, except that a second stage of potassium graphite intercalate was used. The product was characterized by X-ray diffraction (Ic=18.9 Angstroms) and optical spectroscopy. Two major maxima at 420 nanometers and 842 nanometers, with an intensity ratio of 1 to 2, which is characteristic of the TCNQ radical, were observed.

EXAMPLE 13

A sample of HOPG was immersed into a dry deareated acetonitrile (or acetone) solution containing a mixture of potassium iodide (KI) and TCNQ (molar ratio is 1:1) for 24 hours at 60° C. The charge transfer salt intercalated graphite formed was characterized by X-ray diffraction method, which revealed with an Ic=19.0 Angstroms.

EXAMPLE 14

Copper chloride was intercalated into graphite in a standard manner. Copper chloride and graphite were placed in separate zones of a two zone vapor transport reactor. The reactor was then brought to a temperature of at least 500° C. and to a pressure of at least 600 mm—Hg (chlorine gas). The reaction conditions were maintained for a period of at least 72 hours to prepare a first stage copper chloride ($CuCl_2$) intercalated graphite with an interlayer spacing of 9.40 Angstroms.

Some of the copper chloride intercalated graphite was reduced to cuprous chloride (CuCl) intercalated graphite by contact with hydrogen gas ($H_2$) at about 100° C. The sample was then reacted with a TCNQ solution as described in Example 11 to give $CuCl+TCNQ^-$ and $Cu^+TCNQ^-$ charge transfer salt intercalated graphite. Although X-ray data showed that the interlayer spacing was virtually unchanged (18.85) from that of graphite intercalated with copper chloride, the infrared adsorbtion spectroscopy revealed that the characteristic spectra of the TCNQ radical was present in the product, thereby evidencing the formation of the charge transfer salt.

Industrial Application

The development of a stable graphite intercalation compound opens up many technological possibilities. Graphite is an extremely inexpensive starting material. Therefore, it may be used as an inexpensive and lightweight electrical conductor. The graphite metal charge transfer salt can be shaped or formed by methods analogous to those used with plastic, giving it a versatility far superior to metal conductors.

Metal conductors such as copper, which is most widely used due to its high conductivity and low resistivity properties, are becoming increasingly expensive. Graphite metal charge transfer salts could be used as an inexpensive conductor to replace copper. Further, since the graphite intercalate salt has substantially different stability properties than copper, it could be a preferred material in applications where copper corrosion is a problem.

In airborne and transportation related activities, the weight of electrical conductors adds substantially to transportation costs. The graphite intercalate salt is a lightweight conductor that is far lighter than copper and therefore particularly useful in transport vehicles.

Substitution of graphite salt for metal saves weight on aircraft and therefore saves expensive fuel. It is therefore evident that especially in avionic applications where weight is an important factor this graphite intercalation salt could be an important money saver.

The graphite compound can also be used as conductive shielding for sensitive electronics. Common shielding is usually made of metal such as aluminum, steel or copper. These metals are both expensive and heavy. Metal charge transfer salt intercalated graphite is inexpensive and nearly as good a conductor of electricity as metals. Further, since the graphite is extremely light and malleable, it is easy to incorporate into molded or machine forms which can be used to shield electronics. Since the graphite salt is air stable, none of the special encapsulation or handling problems that plague other graphite intercalation compounds will be encountered during its use.

Equivalents

There are many substitutions which can be made in the methods disclosed above without departing from the spirit and scope of the invention as described in the appended claims. Many different graphite starting materials can be considered for synthesis of the metal charge transfer salt disclosed in this application. It should also be noted that the alkali metal and organic acid combinations may be varied from those described in the illustrative examples. Finally, those skilled in the art will recognize or be able to ascertain using no more than routine experimentation, that there are many equivalents to the specific examples in the invention described herein.

Such equivalents are intended to be covered by the following claims.

I claim:

1. An intercalated graphite material in which the intercalant has the formula:

$$M^+R^-$$

wherein:
$M^+$ is selected from the group consisting of:
(a) cations of alkali metals;
(b) cuprous chloride (CuCl); and
(c) cupric chloride $CuCl_2$ and
$R^-$ is an anion radical group of an organic acid selected from the group consisting of:
(a) 7,7,8,8-Tetracyanoquinomethane;
(b) Tetracyanoethylene;
(c) Tetrachloroethylene;
(d) 1,2,4,5 Tetracyanobenzene;
(e) Diphenylacetylene;
(f) 1,2 Dicyanobenzene; and
(g) 1,4 Dicyanobenzene.

2. An intercalated graphite material in which the intercalant has the formula:

$$M^+R^-$$

wherein:
$M^+$ is a cation of a metal selected from the group consisting of:
(a) Potassium;
(b) Rubidium;
(c) Cesium; and
(d) Lithium; or
$M^+$ is cuprous chloride (CuCl) or cupric chloride ($CuCl_2$); and
$R^-$ is an anion radical group of an organic acid selected from the group consisting of:
7,7,8,8-Tetracyanoquinomethane (TCNQ);
Tetracynaoethylene (TCNE);
Tetrachloroethylene;
1,2,4,5,Tetracyanobenzene (TCNB);
Diphenylacetylene;
1,2 Dicyanobenzene; and
1,4 Dicyanobenzene.

3. Graphite intercalated with a charge transfer salt comprising an organic electron acceptor anion radical selected from the group consisting of:
(a) 7,7,8,8-Tetracyanoquinomethane;
(b) Tetracyanoethylene;
(c) Tetrachloroethylene;
(d) 1,2,4,5 Tetracyanobenzene;
(e) Diphenylacetylene;
(f) 1,2 Dicyanobenzene; and
(g) 1,4 Dicyanobenzene,
and a material selected from the group consisting of:
(a) Potassium;
(b) Rubidium;
(c) Cesium;
(d) Lithium;
(e) cuprous chloride (CuCl); and
(f) cupric chloride ($CuCl_2$).

4. A stabilized intercalate of graphite containing a metal charge transfer salt comprising:
a cation of an alkali metal, cuprous chloride or cupric chloride and
an anion radical group of an organic acid selected from the group consisting of:
(a) 7,7,8,8-Tetracyanoquinomethane;
(b) Tetracyanoetylene;
(c) Tetrachloroethylene;
(d) 1,2,4,5 Tetracyanobenzene;
(e) Diphenylacethylene;
(f) 1,2 Dicyanobenzene; and
(g) 1,4 Dicyanobenzene,
and characterized by the formation of anion-radical salts which stablize the metal intercalant in an ionic state.

5. The stabilized intercalate of claim 4 wherein the metal charge transfer salt comprises cuprous chloride (CuCl) or cupric chloride ($CuCl_2$) and the organic acid is 7,7,8,8-Tetracyanoquinomethane.

6. The stabilized intercalate of claim 4 wherein the alkali metal is Potassium.

* * * * *

UNITED STATES PATENT AND TRADEMARK OFFICE
CERTIFICATE OF CORRECTION

PATENT NO. : 4,608,192
DATED : August 26, 1986
INVENTOR(S) : Sophia R. Su

It is certified that error appears in the above—identified patent and that said Letters Patent is hereby corrected as shown below:

Col. 10, line 44, rewrite "Tetracyanoetylene" as
--Tetracyanoethylene--

Col. 10, line 49, rewrite "Diphenylacethylene" as
--Diphenylacetylene--.

Signed and Sealed this

Twenty-third Day of December, 1986

Attest:

DONALD J. QUIGG

Attesting Officer    Commissioner of Patents and Trademarks